(12) United States Patent
Abdalla

(10) Patent No.: US 6,625,499 B2
(45) Date of Patent: Sep. 23, 2003

(54) TABULAR RANGE EDITING MECHANISM

(75) Inventor: Samuel Abdalla, Kanata (CA)

(73) Assignee: Mitel Knowledge Corporation, Ontario (CA)

( * ) Notice: Subject to any disclaimer, the term of this patent is extended or adjusted under 35 U.S.C. 154(b) by 290 days.

(21) Appl. No.: 09/755,558

(22) Filed: Jan. 5, 2001

(65) Prior Publication Data

US 2001/0007959 A1 Jul. 12, 2001

(30) Foreign Application Priority Data

Jan. 7, 2000 (GB) .............................................. 0000207

(51) Int. Cl.⁷ .............................................. G05B 11/01
(52) U.S. Cl. ........................ 700/25; 715/503; 715/504; 715/539
(58) Field of Search ...................... 700/25, 83; 715/503, 715/504, 539

(56) References Cited

U.S. PATENT DOCUMENTS

| | | | | |
|---|---|---|---|---|
| 5,701,499 A | * | 12/1997 | Capson et al. ............... | 715/503 |
| 5,717,939 A | * | 2/1998 | Bricklin et al. ............. | 715/503 |
| 5,819,293 A | * | 10/1998 | Comer et al. ................ | 707/203 |
| 6,112,214 A | * | 8/2000 | Graham et al. .............. | 715/503 |
| 6,134,564 A | * | 10/2000 | Listou ......................... | 715/505 |
| 6,256,649 B1 | * | 7/2001 | Mackinlay et al. .......... | 715/503 |
| 6,282,551 B1 | * | 8/2001 | Anderson et al. ........... | 707/503 |
| 6,389,407 B1 | * | 5/2002 | Paradis et al. ................ | 706/47 |
| 6,549,878 B1 | * | 4/2003 | Lowry et al. ................ | 702/503 |

\* cited by examiner

*Primary Examiner*—John Follansbee
*Assistant Examiner*—Ronald D Hartman, Jr.
(74) *Attorney, Agent, or Firm*—William J. Sapone; Coleman Sudol Sapone, P.C.

(57) ABSTRACT

A method of manipulation of cells within a table on an interactive user display comprising the steps of: (a) selecting a subset of cells of the table as a block on the display, the block having an orientation of fields of the cells along at least one dimension; (b) determining data characteristics of the block for each the field in the direction of the orientation; (c) selecting representative data from the block for each the field in the direction of the orientation; (d) generating a first interface displaying for each the field (i) one or more of the data characteristics; and (ii) corresponding the representative data as an editable element; (e) making user desired modifications to each the editable element to form a changed elements; (f) applying corresponding modifications of each the changed element to all cells of the block in a direction perpendicular to the orientation to form an altered block; and (g) outputting the altered block to the table for display.

6 Claims, 5 Drawing Sheets

|   | Directory Number | User Names | Line Device |
|---|---|---|---|
| 1 | 2001 | Acts | station-00 |
| 2 | 2002 | Adam | station-00 |
| 3 | 2003 | Adolphus | station-00 |
| 4 | 2004 | Aeneid | station-00 |
| 5 | 2005 | Aitken | station-00 |
| 6 | 2006 | Alcoa | station-00 |
| 7 | 2007 | Allentown | station-00 |
| 8 | 2008 | Allis | station-00 |
| 9 | 2009 | Almaden | station-00 |
| 10 | 2010 | Alphonse | station-01 |
| 11 | 2011 | amarillo | station-01 |
| 12 | 2012 | Amy | station-01 |
| 13 | 2013 | Anabel | station-01 |
| 14 | 2014 | Andre | station-01 |
| 15 | 2015 | Andrei | station-01 |
| 16 | 2016 | Angeline | station-01 |
| 17 | 2017 | Anselmo | station-01 |
| 18 | 2018 | Antony | station-01 |
| 19 | 2019 | Arabic | station-01 |
| 20 | 2020 | Arkansan | station-02 |
| 21 | 2021 | Armageddon | station-02 |
| 22 | 2022 | Armco | station-02 |
| 23 | 2023 | Armour | station-02 |

FIG.1A

| Access Permission | Connected Number | | Call Queuing | M W | |
|---|---|---|---|---|---|
| 7 | Restricted | ▼ | ☐ | ☐ | |
| 7 | Restricted | ▼ | ☐ | ☐ | |
| 7 | Restricted | ▼ | ☑ | ☐ | |
| 7 | Restricted | ▼ | ☑ | ☐ | |
| 7 | Restricted | ▼ | ☑ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |
| 7 | Restricted | ▼ | ☐ | ☐ | |

FIG.1B

TABULAR RANGE EDITING MECHANISM

FIELD OF THE INVENTION

The present invention relates generally to the field of information technology and electronic data presentation, manipulation and storage. In particular, it relates to a mechanism and method for modifying the contents of storage of a block of cells in tabular format.

BACKGROUND OF THE INVENTION

The presentation and storage of information and data in electronic form is well known in the art. One particularly useful mechanism has been the use of electronic spreadsheets for performing calculations and storing data. In addition, commercial database products, with appropriately programmed interfaces, are also useful for data storage and manipulation. Tables may be stored in spreadsheet applications, such as Lotus 1-2-3™ from Lotus Corporation, or Excel by Microsoft™, running on a typical personal computer, or stored in a database accessible through a database management system or application interface. Many tables created by applications such as Excel allow for range editing by applying a formula to a block of cells that are of the same data type. When the user is presented with many rows of data in a table, the user can modify this data by editing the individual cells. If a relationship can be applied to the data, then most tables allow the user to apply a certain formula to the selected cells as long as the data is of the same data type. One limitation of such systems is that it is difficult to edit only a subset of the table. Most prior art systems allow for only the editing of individual cells along a particular axis. Moreover, when more than one cell is involved, all affected cells must be of the same data type. Prior art systems lack the ability to alter, modify or edit a subset of cells of a table, where the cells are of different data types. Such prior art systems also lack a mechanism or method of editing only partially the data lying on an axis of the table.

SUMMARY OF THE INVENTION

The present invention may be adopted for use in tables stored in any format including applications such as, spreadsheets, and databases. The method of the present invention is a component that extends the functionality of a given table. The inventive method facilitates editing of a block of cells in a table even if the different columns are not of the same data type. It also can be applied to multi-dimensional tables.

The present invention allows the user to apply a particular editing rule to the different cells on an axis in a self-contained user interface. For example, if the administrator of a very large communication system needs to program all the directory numbers of the system and their corresponding characteristics, he or she can select the rows across the different columns and invoke the user interface of the present invention. These directory numbers are in a sequential order; therefore the administrator can specify the starting directory number and assign an incrementing rule to all the selected cells. If the administrator needs to program other characteristics beside the directory numbers, he or she can apply a rule to each column or even leave a particular column unchanged.

The method of the present invention extends the functionality of a table in that it facilitates modification of data for a block of cells in a table. It also allows the modification of data in different columns that don't have to be of the same data type at the same time. Further, it provides more control through improved validation of the modified data.

According to one aspect of the present invention there is provided a method of manipulation of cells within a table on an interactive user display comprising the steps of: (a) selecting a subset of cells of the table as a block on the display, the block having an orientation of fields of the cells along at least one dimension; (b) determining data characteristics of the block for each field in the direction of orientation; (c) selecting representative data from the block for each field in the direction of orientation; (d) generating a first interface displaying for each field one or more data characteristics; and corresponding representative data as an editable element; (e) making user desired modifications to each editable element to form a changed element; (f) applying corresponding modifications of each changed element to all cells of the block in a direction perpendicular to the orientation to form an altered block; (g) outputting the altered block to the table for display.

BRIEF DESCRIPTION OF THE DRAWINGS

A detailed description of the preferred embodiments is provided herein below, with reference to the following drawings in which:

FIG. 1 is a representative example of a user interface showing a table with a selected block employing the present invention;

DETAILED DESCRIPTION OF THE PREFERRED EMBODIMENT

Figure 2:
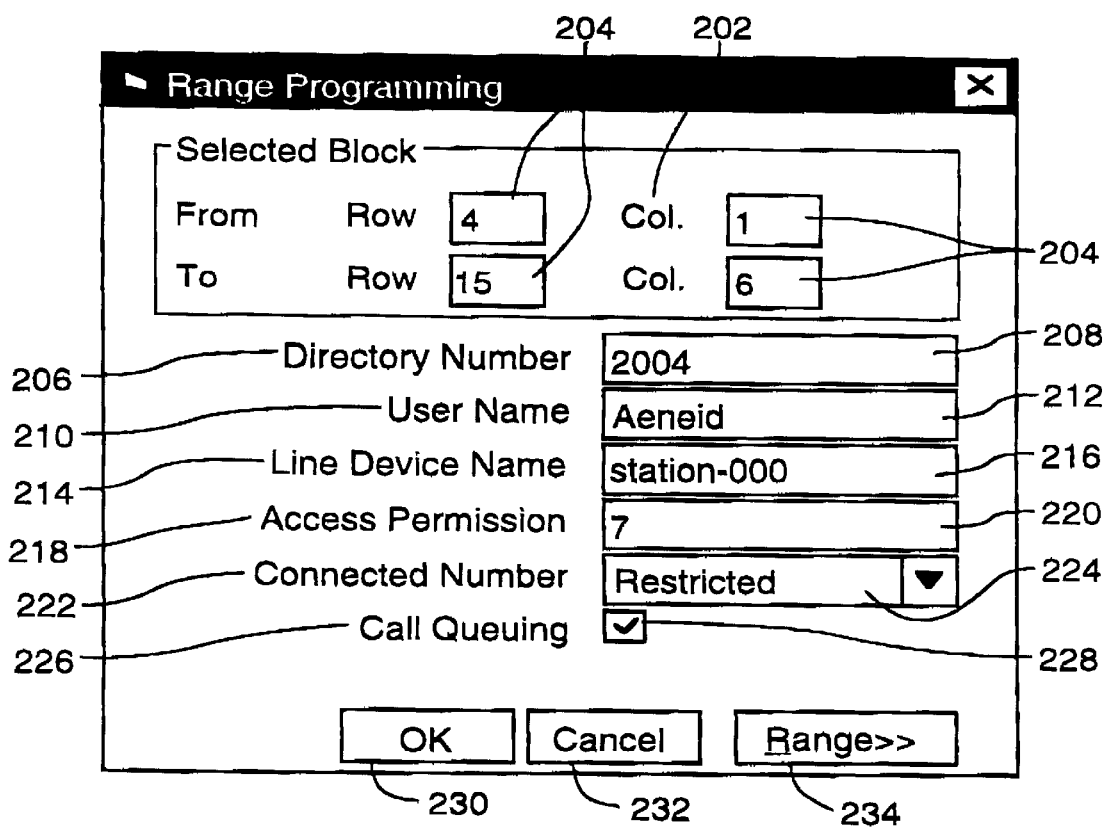
FIG. 2 is a representative example of an editing interface for the selected block in FIG. 1.

FIG. 1 shows a user interface 100 with a table 102 in a computer windowing environment. Such windowing environments are well known in the art. In a preferred embodiment, the user interface 100 of the present invention operates in the windowing environment of Windows 95™ (or in any Win32 environment (i.e. Windows 95, Windows 98, Windows NT)) running on a personal computer as is well known in the art. Such personal computers include a graphical display, with inputs and outputs provided through a keyboard or mouse or such similar device. User interface 100 may be the interface to a spreadsheet or database or any application where information is displayed in tabular format. While the example of FIG. 1 shows table 102 as two-dimensional, it should be recognized that the invention is not limited to operation in only two dimensions and may be applied to any table of any number of dimensions. Table 102 is for illustrative purposes only and not meant to limit the invention in any way. Table 102 is displayed on the graphical display with the data or formulas stored in memory of the personal computer. The memory may be disk memory or RAM memory.

The present invention may be implemented in software, written in any suitable programming language well known in the art and in the preferred embodiment, the method of the present invention makes the use of the Component Object Model (COM) concepts. Each of the software agents could be implemented using Object Linking and Embedding (OLE) Component Object Model (COM) objects. Both OLE and COM were developed by Microsoft® and are described at the Internet site "www.microsoft.com/oledev.olecom/aboutole.html." It provides an interface to the user in order to set the selected block and the initial data.

Tables can have multiple dimensions and numerous cells along each dimension. Where there are two dimensions displayed such as in table 102, it is conceptually preferable to refer to them as rows 104 and columns 106. Data or formulas can be entered and stored in the cells of a table. The term data will be used hereinafter to refer to both data and formulas, as the invention may be adapted with modifications obvious to those skilled in the art to be used with formulas as well as data. Typically a table has an orientation in at least one particular direction or dimension. The orientation of a table is an axis such that each successive cell in that particular dimension or direction is a different field. Table 102 is oriented along the horizontal, with each column 106 representing a different field. When you travel on a table perpendicular to the direction of orientation, then cells in that direction represent instances of that field. In table 102, each row 104 represents a different instance. Each particular field of a table can have numerous characteristics. Such characteristics can include the field name and data type, and data verification and validation may be associated with each field. The user interface 100, using the point and click of a mouse or such similar device or method as is well known in the art, allows the selection, by a user of items on the user interface 100, including desired cells of table 102. A block 108 of cells, (also known as a grid) is shown as selected within table 102. The block 108 inherits the characteristics of the table 102. The selected block 108 consists of cells within a first selected starting row 110, ending row 112, starting column 114 and ending column 116. Once the block 108 is selected, the user initiates the dialog of FIG. 2 by a double mouse click, menu selection or such other method as is well known in the art. The method and system of the present invention determines the characteristics of each field of the block 108 in the direction of the orientation of the block 108. It also selects instances of each field of data of the block 108 from preferably the first cells of the block 108 in the direction perpendicular to the orientation of the block 108 as representative data. For example, in block 108, the characteristics of each column such as a data type, the column title, and the minimum and maximum values along with the first data from the first selected row 110 for each selected column of block 108 is obtained. At that point, the editing interface is generated, such as shown in FIG. 2.

Turning to FIG. 2 there is shown an example of an editing interface 202. Optionally, the coordinates of the selected block are displayed in editable boxes 204. The interface 202 also shows at least one aspect of the data characteristics of each field in the direction of the orientation of the block. Interface 202 also shows the representative data for each field. In most situations, the data characteristic of the field name will be shown. On interface 202, the field name 206 "directory number" is shown with corresponding data "2004" in editable field 208. Likewise, the field name 210 "user name" is shown with corresponding data "Aeneid" in editable field 212, the field name 214 "line device name" is shown with corresponding data "station-000" in editable field 216, the field name 218 "access permission" is shown with corresponding data "7" in editable field 220, the field name 222 "connected number" is shown with corresponding data "Restricted" in editable field 224, and the field name 226 "call queuing" is shown with corresponding data "√" in editable field 228. Field names 206, 210, 214, 218, 222 and 226 represent the data characteristic of column names from selected block 108 of FIG. 1. Editable fields 208, 212, 216, 220, 224 and 228 correspond to the representative data in row 110 of block 108 of FIG. 1.

In operation, if a change is made to one of the fields and applied (i.e. by pressing "OK" button), all cells of the corresponding column in the selected block change to the new value. For example, if the user changes the User Name field from "Aenid" to "Adams" and applies the changes, the User Name column in FIG. 1 is updated to the value "Adams" from row 4 to row 15. Thus, only fields have been changed, are detected and applied to the selected block. Any unchanged fields remain unchanged in the block.

Each of editable fields 208, 212, 216, 220, 224 and 228 may take on the characteristics of the corresponding data type for the field. For example, editable field 220 is a list box with limited values available which would have been inherited from the particular field characteristics of the table. Thus the contents depend upon the data type of the field set in the table.

A user can modify the data in editable fields 208, 212, 216, 220, 224 and 228 as desired and when completed, the user can select the appropriate control, such as OK button 230 to complete the activity. However, editable fields 208, 212, 216, 220, 224 and 228 may perform validation at the time of data entry, depending on the field characteristics, to ensure that only valid data is entered. The editing interface 202 verifies the modified data against the validation information provided by the block such as the minimum and maximum values. The editing interface 202 disallows the user from entering invalid data type in any of its editable fields such as: (1) Non numeric data in an integer field; and (2) Non number data in a float field except for a decimal point. The editing interface 202 disallows the user from entering a value in a field that is out of range.

Corresponding modifications to each changed editable field are then applied to all cells of the block in a direction perpendicular to the orientation of the block. The altered block is then transferred back to the table. The user may optionally select the Cancel control button 232 if the user desires not to make any changes to the block.

Figure 3:
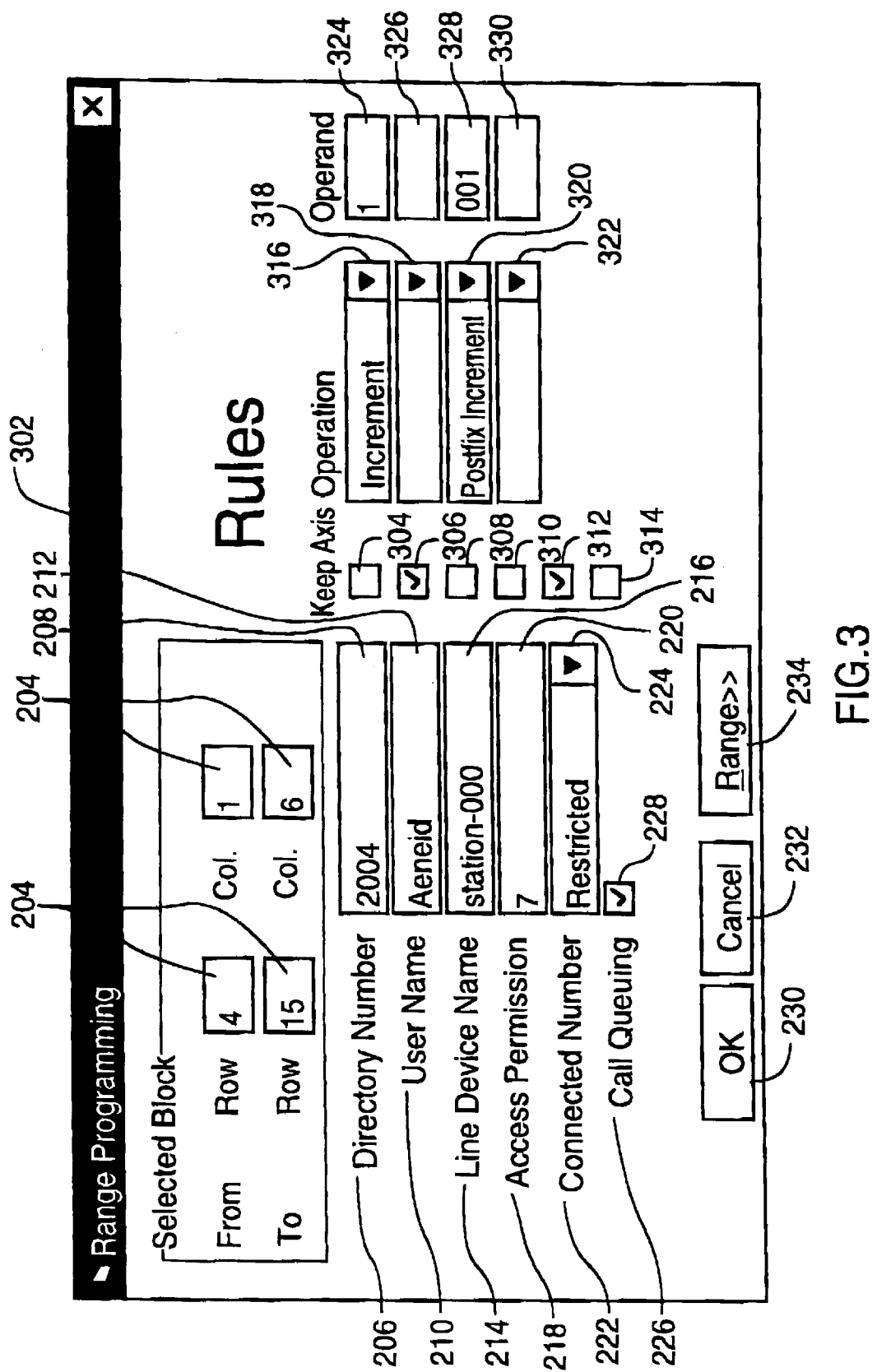
FIG. 3 is a representative example of an alternate embodiment of an editing interface for the selected block in FIG. 1.

In a further, alternate embodiment, the user may optionally select the range control button 234 to perform fisher editing functions on the block, as set forth in FIG. 3, which illustrates an alternative editing interface 302. In the system of FIG. 2, the rules are not presented to the user, although the user may activate range control button 234 to display editing interface 302. However, upon opening the interface 302, the rules can be applied to the selected fields. Editing interface 302 appears as an extension of editing interface 202 of FIG. 2 and operates in a similar manner. Editing interface 302 also contains rules that can be applied to each corresponding field. For each of field names 206, 210, 214, 218, 222 and 226, there is a corresponding set of one or more rules along with right-hand side. For example, field name 206 has corresponding rules in editable elements 304, 316 and 324. Field name 210 has corresponding rules in editable elements 306, 318 and 326, and so on. The rules are editable and depend on the data type of the field corresponding to the field name. The rules may include a "seep As Is" selection shown as editable elements 304, 306, 308, 310, 312 and 314. The rules may also include an Operation selection such as editable elements 316, 318, 320 and 322 and an Operand selection such as editable elements 324, 326, 328 and 330. Each of editable elements 316–330 may vary depending on the data type of the field. The "Keep As Is" rule in editable elements 304 to 314 is a check-box that is provided so that the user can leave the data without modifying it as shown in editable elements 306 and 312. The "Operation" rule in editable elements 316 to 322 is a list box with its contents depending on the data type of the field. For example, 1. Increment and decrement operations are valid if the data type of the corresponding fields is integer, real, date or time; and
2. Post-fix and prefix increment and decrement are valid if the data type of the corresponding field is a string.

The "Operand" rule in editable elements 324 to 330 indicates the value by which to increment or decrement, or the text string by which to post/prefix increment or decrement the string field. The editing interface 302 disallows the user from entering invalid values in the Operand editable fields, such as:

1. Non numeric data for integer fields; and
2. Non alphanumeric characters for string fields.

It also prevents the user from incrementing or decrementing a field so that a particular cell in the selected block will go out of range. After editing by the user, the rules are applied to the data in the block, then the altered block is written back.

Figure 4:
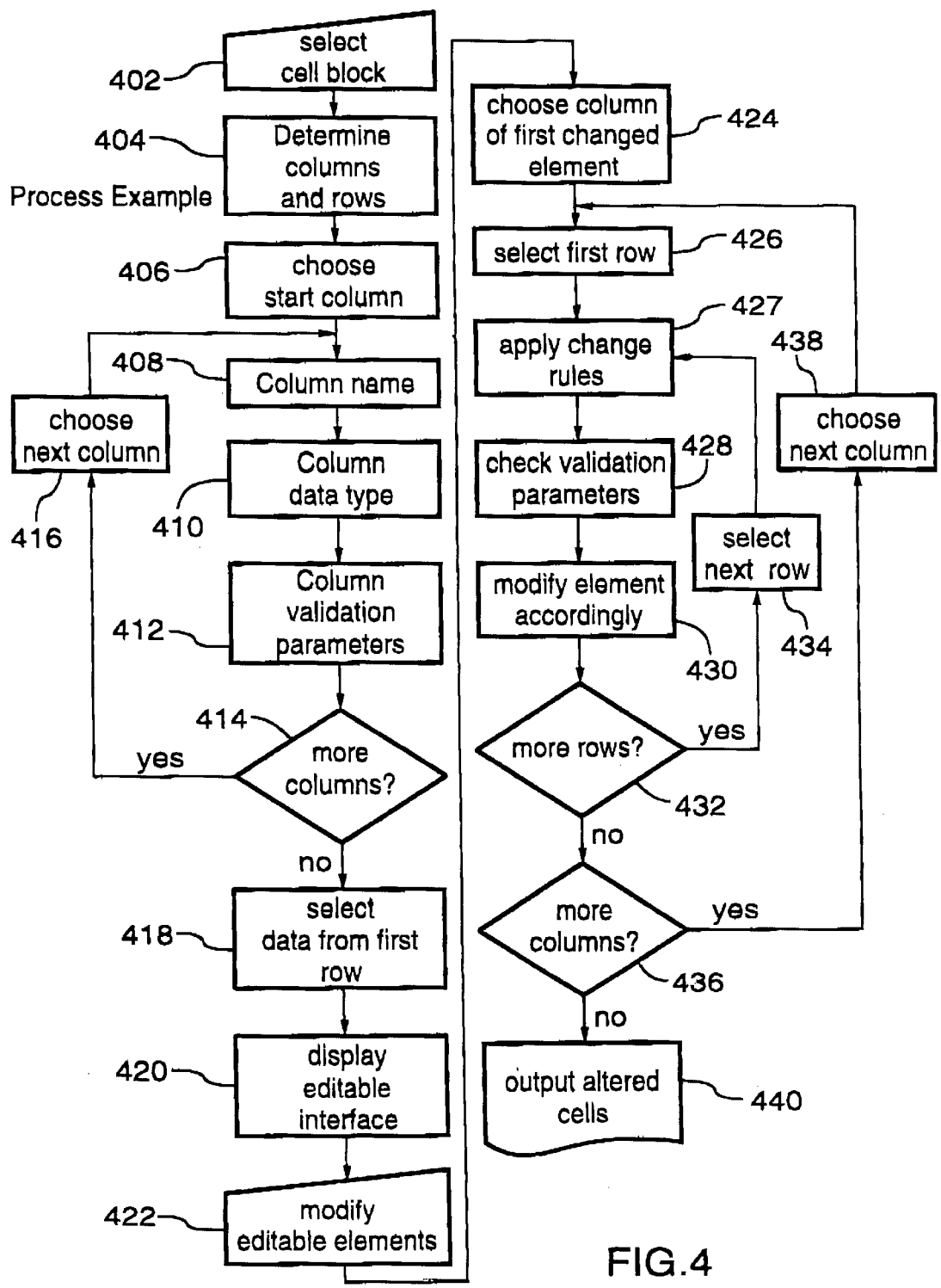
FIG. 4 is a flowchart diagram showing an example of the operation of the present invention for a table with rows and columns.

Turning to FIG. 4, a flowchart illustrating the operation of the method of the present invention is shown. While the inventive method is demonstrated in a flowchart, it should be recognized that the method of the present invention may be implemented using object oriented programming. FIG. 4 shows steps where the selected block is two dimensional and described in terms of rows and columns with an orientation across the columns of the table. The flowchart can easily be modified in a manner obvious to one skilled in the art to deal with tables in more than two dimensions. At step 402, the user selects the desired cells of the table to form the block of cells upon which the operations are to be performed. At step 404, the columns and rows of the cells which form the boundaries of the block are determined and may be used to determine the coordinates for display on the interface. At step 406, the starting column of the block of cells is used as a starting position to determine the characteristics of the field in that column. At atop 408, the field characteristic column name is obtained. At step 410, the field characteristic column data type is obtained. At step 412, the field characteristic validation parameters for the column is obtained. At step 414, a test is done to determine whether more columns exist. If so, then step 416 is executed so that the next column is selected and steps 408 to 414 repeat. Steps 408 to 414 are repeated for each column in the selected block. When no more columns exist, then the test at step 414 fails, and step 418 executes. At step 418, the representative data, from the first row of the selected block, is obtained. At step 420, the editable interface of either FIG. 2 or 3 is displayed with information gathered from steps 408 to 418. At step 422, the editable elements are modified as desired by the user. At step 424, the column of the first changed element is determined and used as a starting position for the current column when the user completes making changes in the interface of FIG. 2 or 3, as signaled by initiating the OK button 230. At step 426, the first row of the current column is determined and used for a starting position for applying the modifications of cells. Then, at step 427, the specific cell identified by row and column is targeted and the change rule is applied to the specific cell. At step 428 the validation parameters for the specific cell are checked against the desired modification made by the user. At step 430, if the modification falls within the validation parameters, the element is modified. If the desired modification puts the cell outside the validation parameters, then no change is made. At step 432, a test is made to determine if more rows exist within the current column. If more rows do exist, then at stop 434, the next row is selected and steps 427 to 432 repeat until no more rows exist in the current column. When no more rows exist in the current column, then a test is performed at step 436 to determine if more columns exist. If more columns do exist, then step 438 is executed and the next column is selected as the current column. Steps 426 to 436 then repeat until no columns are left. The test at step 436 fails, then step 440 is executed and the modified cells of the selected block are output to the table.

Although the invention has been described in terms of the preferred and several alternate embodiments described herein, those skilled in the art will appreciate other embodiments and modifications which can be made without departing from the spirit and scope of the teachings of the invention. All such modifications are intended to be included within the scope of the claims appended hereto.

I claim:

1. A method of manipulation of a selected block of cells within a table having an orientation of a plurality of fields in at least one dimension, the table presented on an interactive user display comprising the steps of:
    (a) selecting a subset of cells of said table as a block on said display, said block having an orientation of two or more of the plurality of fields of said cells along at least one dimension;
    (b) identifying characteristics of each of said fields of said block, in the direction of said orientation;
    (c) selecting a cell containing representative data for each of said fields of said block in the direction of said orientation;
    (d) generating a first interface and displaying at least a field name for each of the fields of said block and the corresponding representative data in an editable form;
    (e) selecting and modifying the representative data of any one of said fields of said block along the at least one dimension;
    (f) correspondingly modifying the data of each cell of the block in a direction perpendicular to the modified representative data cell; and
    (g) returning the block of cells with the modified data to said table for display.

2. The method of claim 1 wherein said data characteristics for each said field includes one or more of name, data type and validation parameters.

3. The method of claim 1 wherein said first interface includes editable rules corresponding to each said field in the direction of said orientation as an editable element such that said editable rules are applied when forming said altered block.

4. A method of manipulation of a select subset of cells within a table having an orientation of a plurality of fields in at least one dimension, the table presented on an interactive user display comprising:
    (a) selecting a subset of cells of said table, said subset of cells including at least two fields;
    (b) identifying characteristics of each of said fields of said subset of cells;
    (c) selecting a cell containing representative data for each of said fields;

(d) generating a first interface and displaying for each of said fields at least a field name for each of the fields and the corresponding representative data in an editable form;

(e) selecting and modifying the representative data of at least one of said fields;

(f) correspondingly modifying the data of each cell in the at least one field;

(g) returning the subset of cells with the modified data to said table for display.

5. The method of claim 4 wherein said data characteristics for each said field includes one or more of name, data type and validation parameters.

6. The method of claim 4 wherein said first interface includes editable rules corresponding to each said field in the direction of said orientation as an editable element such that said editable rules are applied when forming said altered block.

* * * * *